United States Patent [19]

Kallman et al.

[11] Patent Number: 5,657,150
[45] Date of Patent: Aug. 12, 1997

[54] ELECTROCHROMIC EDGE ISOLATION-INTERCONNECT SYSTEM, PROCESS, AND DEVICE FOR ITS MANUFACTURE

[75] Inventors: William R. Kallman, Portland; James D. Williams, Forest Grove; Albert E. Ozias, Aumsville; Leonard M. Dorfman, Tigard; Christian F. Schaus, Wilsonville; Geoffrey A. Russell, Beaverton; Scott G. Wills, Portland; David G. Keeney, Milwaukie, all of Oreg.

[73] Assignee: Eyeonics Corporation, Tualatin, Oreg.

[21] Appl. No.: 182,792

[22] Filed: Jan. 13, 1994

Related U.S. Application Data

[63] Continuation-in-part of Ser. No. 119,749, Sep. 10, 1993, abandoned.

[51] Int. Cl.[6] ................................ G02F 1/153
[52] U.S. Cl. .................. 359/275; 359/265; 359/274; 351/49
[58] Field of Search ..................... 359/265, 266, 359/267, 269, 271, 273, 275, 274; 351/49, 174

[56] References Cited

U.S. PATENT DOCUMENTS

| | | | |
|---|---|---|---|
| 3,683,168 | 8/1972 | Tatje | 362/105 |
| 3,744,886 | 7/1973 | Filitz | 351/113 |
| 3,844,636 | 10/1974 | Maricle | 350/160 |
| 4,135,790 | 1/1979 | Takahashi et al. | 359/275 |
| 4,182,551 | 1/1980 | Washida et al. | 359/274 |
| 4,193,670 | 3/1980 | Giglia et al. | 359/274 |
| 4,249,804 | 2/1981 | Stohrer | 351/121 |
| 4,278,329 | 7/1981 | Matsuhiro et al. | 359/275 |
| 4,293,194 | 10/1981 | Takahashi | 266/270 |
| 4,325,611 | 4/1982 | Huggins et al. | 350/357 |
| 4,350,414 | 9/1982 | Takahashi et al. | 350/357 |
| 4,392,721 | 7/1983 | Giglia et al. | 350/357 |
| 4,433,901 | 2/1984 | Takahashi et al. | 350/357 |
| 4,529,873 | 7/1985 | Ballmer et al. | 250/201 |
| 4,585,312 | 4/1986 | Ishiwata et al. | 350/357 |
| 4,618,226 | 10/1986 | Sartor et al. | 351/113 |
| 4,645,308 | 2/1987 | Tracy et al. | 350/357 |
| 4,652,090 | 3/1987 | Uchikawa et al. | 350/357 |
| 4,756,605 | 7/1988 | Okada et al. | 350/347 V |
| 4,790,636 | 12/1988 | Carlson | 350/357 |
| 4,805,996 | 2/1989 | Carlson | 350/357 |
| 4,824,221 | 4/1989 | Endo et al. | 350/357 |
| 4,867,551 | 9/1989 | Perera | 351/158 |
| 5,007,718 | 4/1991 | Minoura et al. | 359/265 |
| 5,011,582 | 4/1991 | Oshikawa et al. | 204/140 |
| 5,076,673 | 12/1991 | Lynam et al. | 359/271 |
| 5,129,716 | 7/1992 | Holakovszky et al. | 351/50 |
| 5,148,306 | 9/1992 | Yamada et al. | 359/271 |
| 5,187,607 | 2/1993 | Endo et al. | 359/266 |
| 5,202,788 | 4/1993 | Weppner | 359/270 |
| 5,377,039 | 12/1994 | Babinec | 359/265 |

*Primary Examiner*—Georgia Y. Epps
*Assistant Examiner*—Dawn-Marie Bey
*Attorney, Agent, or Firm*—Kolisch, Hartwell, Dickinson, McCormack & Heuser

[57] ABSTRACT

An electrochromic device for use in the field of optical lenses. The device includes a substrate having an expanse and an edge region. A first electrode layer is coated on the expanse and extends substantially across the expanse and into the edge region. An electrochromic layer is coated on the first electrode so that the first electrode layer physically isolates the electrochromic layer from the substrate. A second electrode layer is coated on the electrochromic layer, so that the electrochromic layer physically isolates the second electrode layer from the first electrode layer. A first contact is electrically connected to the first electrode layer. An isolative barrier is coated on the first electrode layer in the edge region. A second contact is electrically connected to the second electrode layer. Alternatively, an isolative channel is formed in the second electrode layer to electrically isolate the first electrode layer from the second electrode layer.

58 Claims, 4 Drawing Sheets

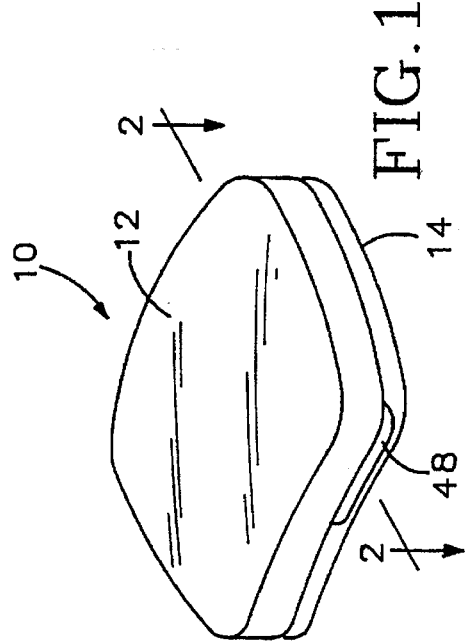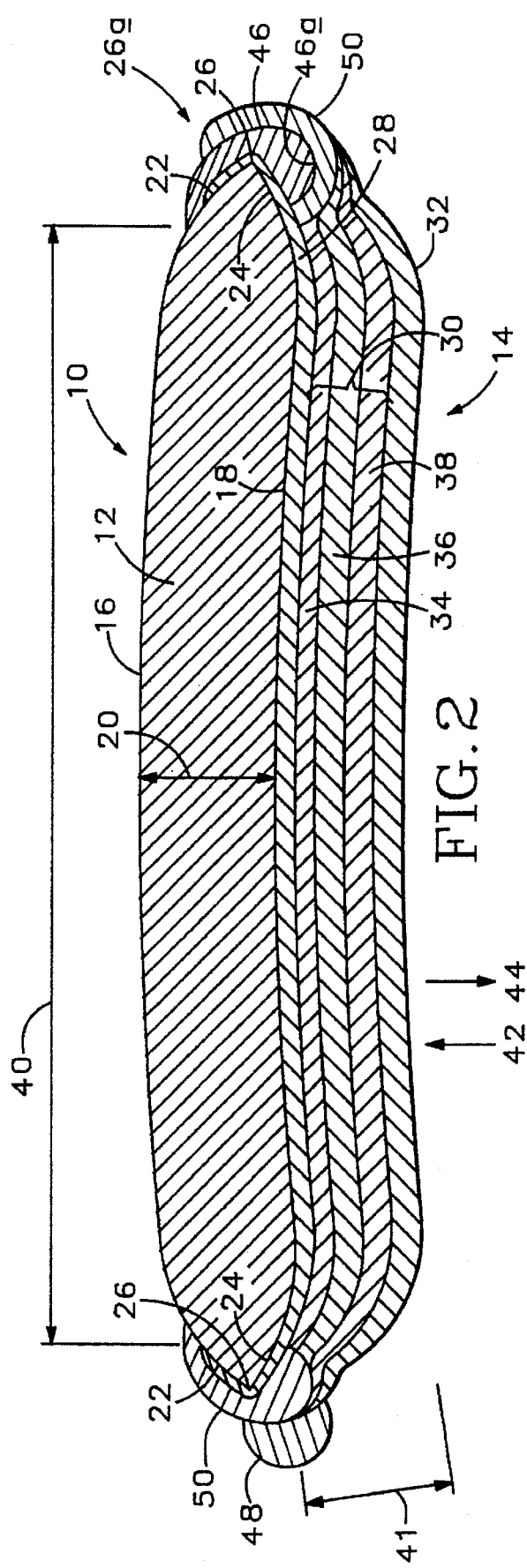

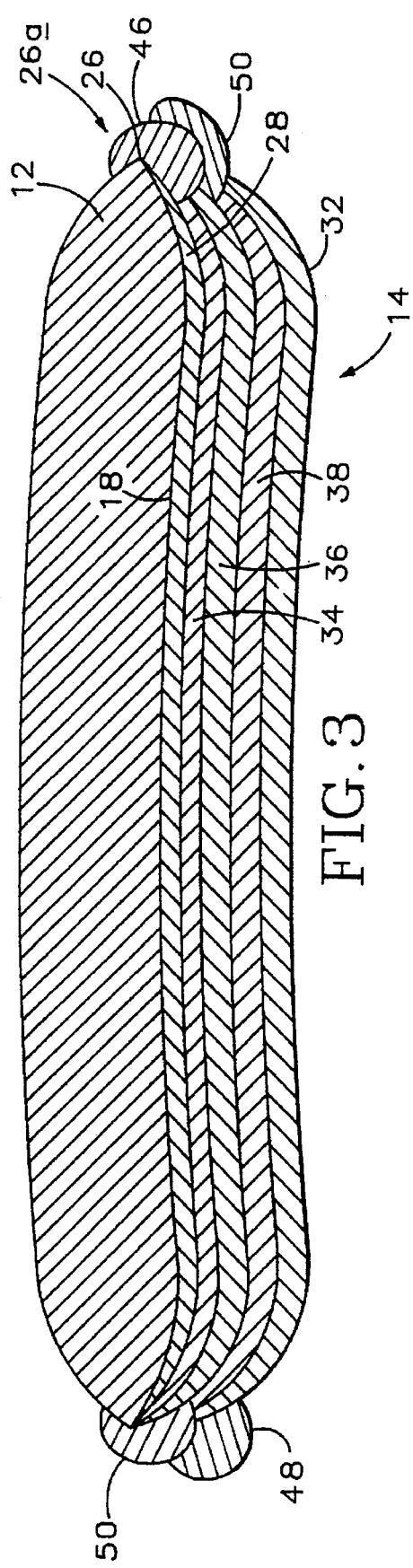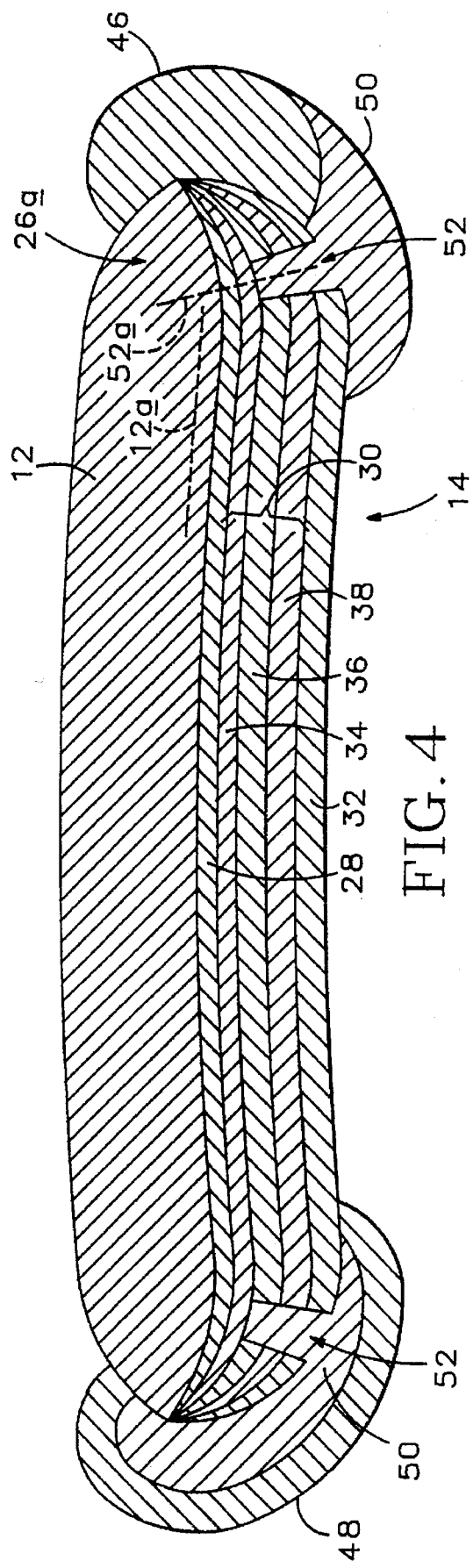

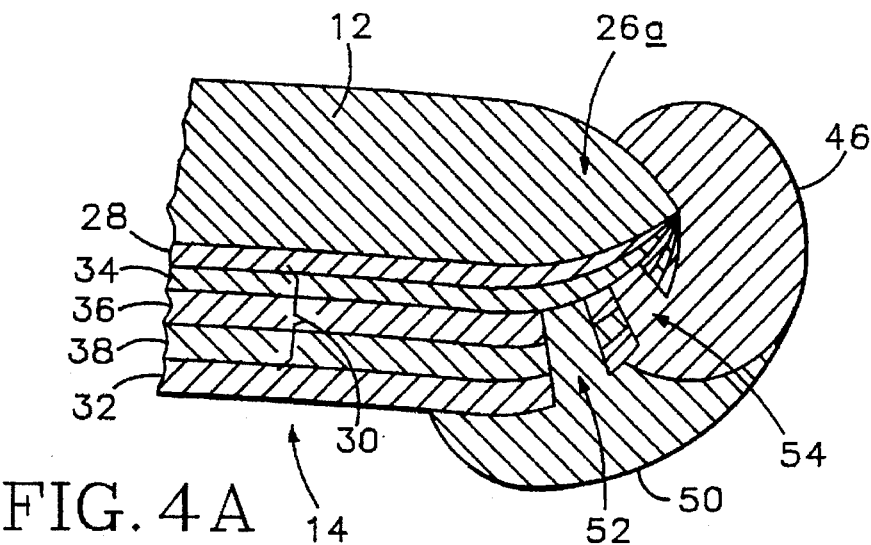
FIG. 4A
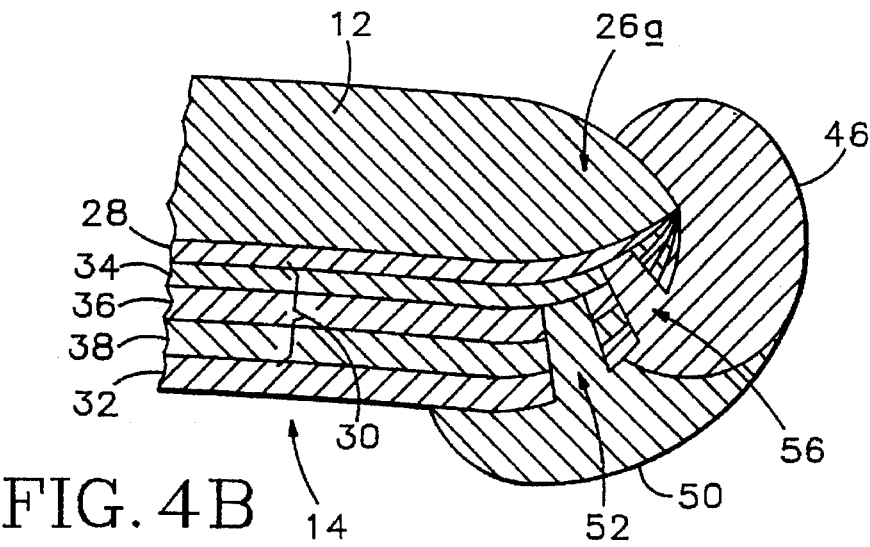
FIG. 4B
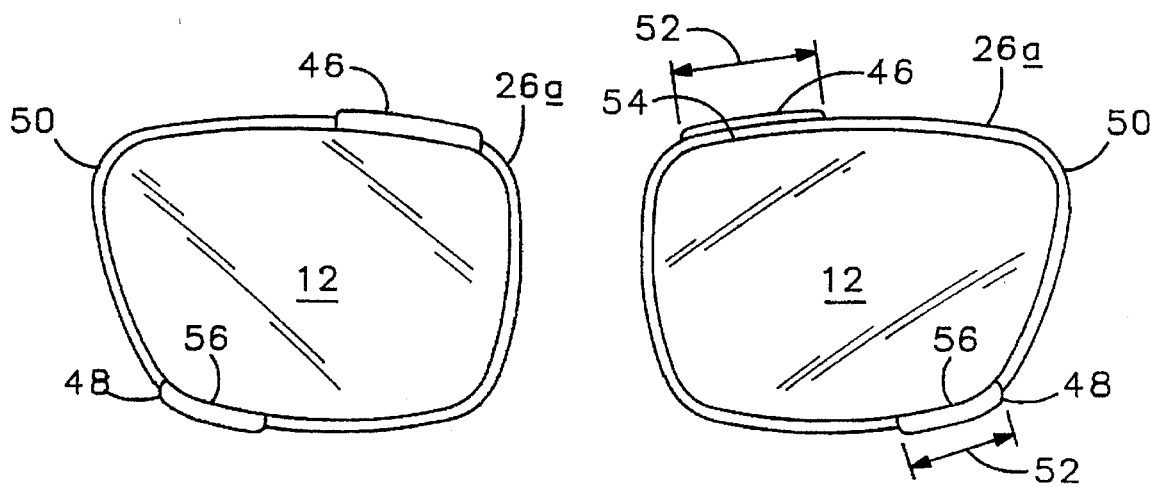
FIG. 5
FIG. 6

ELECTROCHROMIC EDGE ISOLATION-INTERCONNECT SYSTEM, PROCESS, AND DEVICE FOR ITS MANUFACTURE

This is a continuation in part of application Ser. No. 08/119,749 filed Sep. 10, 1993, abandoned.

BACKGROUND OF THE INVENTION

1. Field of the Invention

This invention relates to an electrochromic device. More specifically, this invention relates to an edge isolation-interconnect system for an electrochromic device, and a process and device for its manufacture. This application incorporates by reference the disclosure of co-pending patent application Ser. No. 08/119,749 filed Sep. 10, 1993 entitled MICRO-ELECTRONIC POWER SUPPLY FOR ELECTROCHROMIC EYEWEAR and which is subject to common ownership herewith.

2. Related Background Art

Problems with electrochromic (EC) devices that must be addressed include isolation and interconnect systems which are visible within the field of view of the device, uneven shade coloration, possible electrical shorting of the EC device, coloration of only a portion of the device, and a complicated, expensive process of applying the coating to the substrate.

Endo, et al., in U.S. Pat. No. 4,824,221, disclose an "Electrochromic Device" including multiple layers unsymmetrically coated between a two-layered, or "sandwich" substrate system. Due to the unsymmetrical coating, the edge isolation region of Endo is visible within the field of view of the substrate. Additionally, the uneven coating may result in uneven shade coloration, and coloration of only part of the substrate. In addition, the uneven coating of Endo is difficult to apply during mass production. Another drawback of Endo is that the double layer substrate system of Endo is expensive to manufacture, particularly in the field of prescription eyewear, windows and the like. Furthermore, the layer system described by Endo is used on a flat substrate, which does not include the process difficulties associated with coating an eyeglass lens. Thus, there is a need for an EC device which overcomes the drawbacks of the prior art.

Accordingly, objects of the current invention include providing an electrochromic device having coated layers on a flat or non-flat substrate, an edge isolation-interconnect system which is aesthetically pleasing, even shade colorization across the entire device, an edge isolation-interconnect system which inhibits electrical shorts, coloration of the entire field of view of the substrate, and a relatively straightforward, repeatable and cost-effective application process for coating layers on a single-layered, eccentric-shaped substrate such as an optical lens or large sheets of substrate which can be cut after the layers are coated thereon.

SUMMARY OF THE INVENTION

The current invention includes an electrochromic (EC) device comprising a substrate such as an eyewear lens, other optic lenses such as cameras, windows, or other optical displays such as clocks, having an expanse and an edge region. The device may also be used as a super-capacitor.

To produce the device, a first electrode layer is applied to or coated on the expanse or generally flat surface, and extends substantially across the expanse and into the edge region. An electrochromic layer is coated on the first electrode so that the first electrode layer physically isolates the electrochromic layer from the substrate. A second electrode layer is coated on the electrochromic layer so that the electrochromic layer physically isolates the second electrode layer from the first electrode layer throughout the field of view. A first contact is electrically connected to the first electrode layer, and a second contact is electrically connected to the second electrode layer. An isolative barrier is coated on the first electrode layer in the edge region so that the isolative barrier electrically isolates the first contact from the second electrode layer and electrically isolates the second contact from the first electrode layer. A controlled electrical contact is then applied to the first and second contacts to power the device.

In another embodiment, the invention may comprise an edge-isolation channel formed in the edge region. The edge-isolation channel is effective to electrically isolate the first electrode layer from the second electrode layer throughout the field of view. The channel also permits controlled contact of a voltage, or potential difference, across or between such layers to power the device. Either the barrier embodiment or the channel inventive embodiment inhibits a short circuit from occurring by undesirable incidental electrical contact or current flow between the first and second electrode layers.

The invention also comprises one or more conductive elastomeric pads for electrically connecting corresponding contacts to the substrate, and a conductive contact, e.g. a flex circuit, along a portion of the EC device's edge region.

The invention also comprises an apparatus, and an associated process, for applying the isolative barrier coating to the perimeter of a noncircular, generally planar substrate, e.g. an eyewear lens. The apparatus comprises a rotary motor adapted for mounting the substrate on the motor's spindle or shaft, the motor being structured to rotate the substrate about its generally normal substrate axis. The apparatus also comprises a linear motion mechanism connected between the motor and a roller mechanism. In a preferred embodiment, the linear motion mechanism moves the rotary motor in a direction generally perpendicular to the substrate axis when the substrate is mounted on the rotary motor. The apparatus further includes a roller mechanism which is rotatable to spread the barrier coating over an outer surface or perimeter of the substrate. The roller mechanism is positioned adjacent a perimeter of the substrate when the substrate is mounted on the rotary motor. One or more rollers of the roller mechanism is capable of rotating on its axis at a fixed angular velocity. The linear motion mechanism and the roller mechanism are operatively associated such that the linear motion mechanism linearly moves the substrate as the motor rotates the substrate such that at a point of contact between the perimeter of the substrate and a roller, the substrate and the roller have the same angular velocity.

The invention also comprises a process for manufacturing an electrochromic device, the process including the steps of using a release agent. Specifically, a release agent is applied to a section of the substrate and then a layer is coated on the substrate. The release agent is then removed, removing a portion of the subsequently coated layer. The process may be repeated for additional layers. In this manner, the location and size of exposed areas for electrical contact are ensured.

BRIEF DESCRIPTION OF THE DRAWINGS

FIG. 1 is an isometric view of a eyeglass lens substrate which shows the outer edge regions of the lens made in accordance with the preferred embodiment and process of the invention.

FIG. 2 illustrates a cross section of the device taken generally along the line 2—2 of FIG. 1.

FIG. 3 illustrates a cross section of a second embodiment of the invention.

FIG. 4 illustrates a cross section of a third embodiment of the invention.

FIG. 4A illustrates a partial cross section of the device of FIG. 4 wherein the device has been subjected to an additional manufacturing step.

FIG. 4B illustrates the device shown in FIG. 4A wherein the device has been subjected to an additional manufacturing step.

FIG. 5 is a front elevation of an eyeglass lens substrate with the edge isolation-interconnect system on the lens.

FIG. 6 is a rear elevation of the lens of FIG. 5.

DESCRIPTION OF THE PREFERRED EMBODIMENTS

Figure 7:
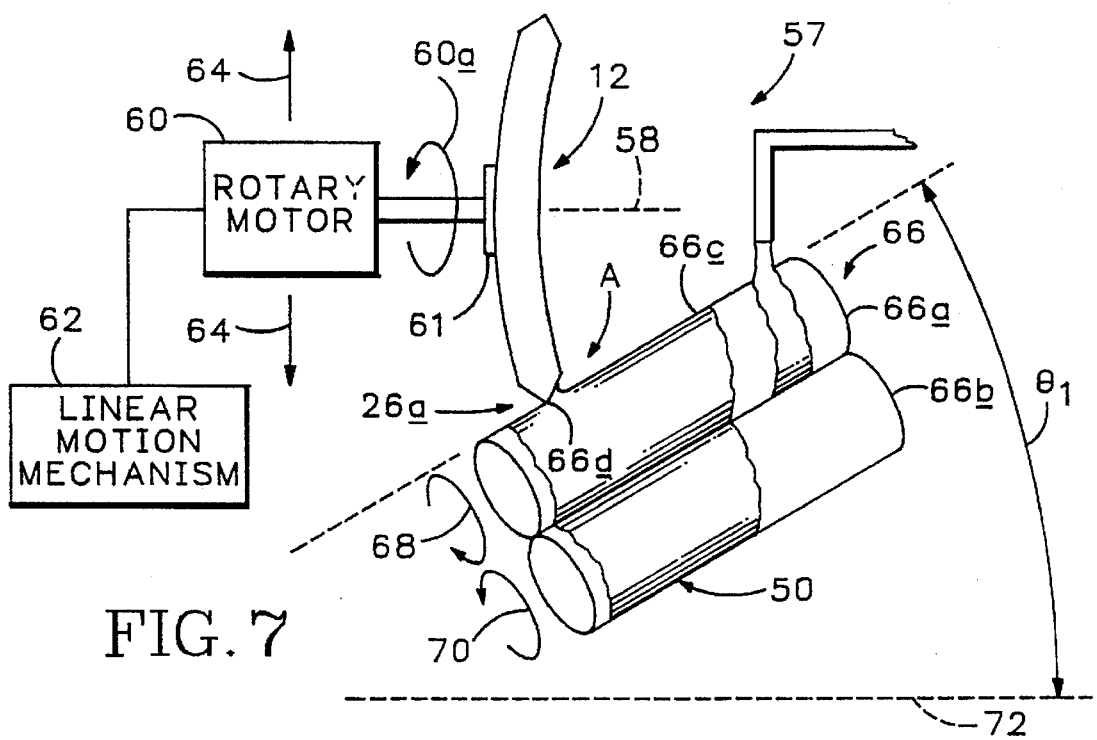
FIG. 7 illustrates apparatus for the manufacture of the invented system according to the preferred embodiment.

The present invention relates to an edge isolation-contact system to isolate predetermined layers coated on a substrate. Typically, as shown in FIGS. 1 and 2, the electrochromic device 10 includes a generally transparent substrate 12, such as an optical lens, and an edge isolation-contact system 14 mounted thereon. Substrate 12 can be manufactured of glass, plastic or any other optical material. Typically, as shown in FIG. 1, substrate 12 is a high-clarity optic lens for use in non-prescription or prescription eyeglasses. However, substrate 12 may be a camera lens, a window, a mirror, a clock face, a display or the like or an electronic device. In many applications, the substrate typically will have a flat edge, not a beveled edge as shown in the figures.

Light transmission through an EC cell, or EC device, is modulated by moving ions in an electrochromic compound layer and a counter-electrode layer by the application of an exterior bias voltage or potential difference between first and second electrode layers which are positioned on opposite sides of the electrochromic and counter-electrode layers. When all the layers of the device are deposited on the substrate in an evaporator, a low resistance leakage path typically will exist between the first and second electrodes in an edge region of the substrate due to the thinness of such layers in the edge region. Thus, it is necessary to provide a way of electrically connecting contacts to the first and second electrodes, while ensuring that electrical isolation is maintained between the first and second electrode layers in the edge region to prevent a short circuit or excessive current flow.

FIG. 2 is a cross section of device 10 shown in FIG. 1, taken along line 2—2. As shown in FIG. 2, substrate 12 has applied thereon edge isolation-contact system 14. Typically, substrate 12 includes a front surface 16, a rear surface 18 and has a thickness 20. Front surface 16 is referred to herein also as outer surface 16. Rear surface 18 is referred to herein also as an inner surface, an expanse, or a generally flat region 18 of substrate 12. Substrate thickness 20 is on the order of 2.0 millimeters (mm) for typical eyeglass lenses. Thickness 20 typically may be between 1.0 and 100 mm for camera lenses or between approximately 1 to 6 mm for a plastic film. However, as is known by those skilled in the art, such dimensions vary widely depending upon the use of substrate 12 and do not inhibit the effectiveness of system 14. Lens 12 further includes an outer bevel region 22, an inner bevel region 24 and a bevel point 26. Bevel regions 22, 24 and bevel point 26 are herein collectively referred to as edge region, or perimeter, 26a.

Still referring to FIG. 2, system 14 typically includes multiple layers such as a first electrode layer 28, an intermediate electrochromic layer 30, and a second electrode layer 32. Intermediate electrochromic layer 30 typically includes three sublayers 34, 36 and 38. Typically, thickness 41 of isolation-contact system 14 is on the order of 1-to-3 micrometers (μm), and is preferably approximately 1.5 μm. Accordingly, the drawings herein are not drawn to scale but instead are enlarged to show detail, with layer and coating thicknesses greatly exaggerated.

As discussed in the co-pending application, the disclosure of which is incorporated herein by reference, the typical EC device includes first electrode layer 28, intermediate electrochromic layer 30 and second electrode layer 32. To power the electrochromic device, a potential difference is applied between first electrode 28 and second electrode 32. This difference in potential results in a coloration and a change in the position of the electrical charge within the device, also called a change in transmissivity of the lens, of intermediate electrochromic layer 30. Removing the potential difference between first electrode 28, which typically is a cathode, and between second electrode 32, which typically is an anode, results in a decolorization or "bleaching" of electrochromic layer 30. Thus, controlling and holding a potential between electrodes 28 and 32 results in a predetermined coloration of field of view 40 through substrate 12.

For even coloration to take place in intermediate layer 30 across field of view 40, an electrical current must move between first electrode 28 and second electrode 32, generally in directions 42 and/or 44 through electrochromic layer 30. Even thickness application of layers 28, 30 and 32 across expanse 18 enhances even shade coloration in field of view 40. Application of the layers completely across field of view 40 and into edge region 26a also permits even coloration substantially throughout field of view 40.

To ensure electrical current movement in directions 42 and/or 44 through intermediate layer 30, the first and second electrodes must be electrically isolated in edge region 26a. Electrical contact between first electrode 28 and second electrode 32 in edge region 26a would result in a short circuit such that current passes through edge region 26a without the desired coloration or bleaching of electrochromic layer 30. However, it is desirous to power device 10 by electrical connections to electrodes 28 and 32 in edge region 26a to maximize field of view 40 and to permit even thickness application of the layers on substrate 12 throughout field of view 40. In addition, electrical contact in edge region 26a places the contacts out of the field of view, enhancing the aesthetic appearance of device 10.

To achieve these dual functions, i.e. edge isolation between the layers and simultaneous edge contact between a layer and an electrical contact, preferably a dual conductive-nonconductive material system is provided. Specifically, a first contact 46 is electrically connected to first electrode 28, and a second contact 48 is electrically connected to second electrode 32. As discussed in the co-pending application, contacts 46 and 48 are typically connected to a flex circuit or other means of wiring and to a battery-operated power system that controls and powers the device. An isolative barrier 50 typically extends throughout perimeter 26a and electrically isolates the first contact from the second electrode layer and electrically isolates the second contact from the first electrode layer.

Still referring to FIG. 2, first and second contacts 46 and 48 may be manufactured of any electrically conductive material, such as noble metals, and preferably of a material including gold ink. More specifically, the conductive material may be any metal which has no mobile ions. The preferred gold ink is a particle filled, thermally curable polymer ink which cures at a low temperature, such as 85° C. Gold ink is preferred due to its high electrical conductivity, corrosion-resistant properties, and ease of application. Contacts 46 and 48 may be applied by plating, soldering, pad printing, rolling, evaporation, brush application, or by any other suitable process.

Isolative barrier 50 may comprise any dielectric material, and preferably includes lacquer. Preferably, the lacquer is a solventless, ultraviolet-(UV)-curable lacquer such as an epoxy acrylate or an organic resin. UV-curable resins are preferred because such resins may be cured without outgassing of solvents, which may harm the delicate layer system. UV-curable resins also cure more quickly than non-UV-curable resins. This reduces the time between beginning the curing process and beginning the next "pump down cycle" of the coating machine. ("Pump down cycle" refers to the time required to create a vacuum pressure inside the coating machine to prepare the machine for the next coating process.) The lacquer may also be an urethane resin. Lacquer is preferred due to its nonconductive properties, ease of application, aesthetics, and low cost.

Still referring to FIG. 2, the process for manufacturing the preferred electrochromic device comprises the following steps. First, substrate 12, typically an optical substrate, is provided, having a generally planar expanse 18 and edge region 26a. First electrode layer 28 is then coated or applied to expanse 18 such that the first electrode layer extends substantially across the expanse and into the edge region. Preferably, first electrode 28 is coated on the entire surface of expanse 18 such that first electrode 28 contacts and extends from bevel point 26 on one side of expanse 18, across expanse 18, and thereafter contacts bevel point 26 on the opposite side of expanse 18. As disclosed in the co-pending application, first electrode layer 28 and all subsequent layers may be applied to substrate 12 through spraying, vapor deposition, vacuum deposition or any like technique. The technique may include physical deposition, plasma-assisted deposition, spray pyrolysis, sol-gel deposition, screen printing or a physical and/or a chemical deposition, such as sputtering and evaporation, the evaporation being either thermal evaporation or electron beam evaporation.

These techniques produce a symmetric, even coating of the layer across expanse 18 in a relatively straightforward and cost-effective manner. In addition, these coating methods coat expanse 18 substantially across expanse 18 and into edge region 26a such that the coating is evenly applied across the entire field of view 40 of lens 12. Most often, these spraying and deposition techniques, as shown in FIG. 2, result in the layers "wrapping-around" bevel point 26. (This "wrapping around" is only shown in FIG. 2 and is not shown in the other figures for ease of understanding.)

In the second step of the process, first contact 46 is applied to first electrode layer 28 along a significant length in edge region 26a. As shown in FIG. 6, first contact 46 extends a significant length 52 along edge region 26a, which may be approximately one-eighth of the perimeter 26a of substrate 12. In addition, first contact 46 may be shorter or longer than one-eighth, and may have a comb-like configuration including teeth-like projections for extending over the thick edge region 26a of thick prescription lenses. These teeth-like projections are necessary for lenses having thick, or long, bevel regions because for good electrical connection first contact 46 preferably must contact a thick portion of first electrode 28, which thins out along the beveled edge region. Applying first contact 46 in edge region 26a positions first contact 46 out of field of view 40 and optimally positions first contact 46 along the substrate such that first contact 46 is hidden within an eyeglass frame when lens 12 is mounted in such a frame. Applying contact 46 along a substantial length of perimeter 26a results in an even potential distribution across expanse 18 which produces even shade coloration of electrochromic layer 30 and allows positioning of contact 46 such that it is substantially or completely hidden from view within an eyeglass frame.

The third step in the process typically involves applying isolative barrier 50 continuously throughout edge region 26a such that barrier 50 coats an inner surface 46a of first contact 46 along the length of first contact 46. In addition, barrier 50 contacts edge region 26a of substrate 12 and first electrode 28 from subsequently to-be-applied layers, continuously around the rest of substrate 12. In this manner, barrier 50 electrically isolates first electrode 28 continuously throughout edge region 26a. As a further benefit of using a lacquer isolation barrier, barrier 50 is typically thicker than the layers coated on the substrate so that the lacquer thickness compensates for any layer roughness which may result in an electrical short. For example, contact 46 may be comprised of gold which has a very rough surface. The rough surface may penetrate through subsequently applied layers, resulting in a short, if the lacquer was not used. The thickness of the lacquer also may compensate for various shaped substrates which have various edge thicknesses or roughness.

To apply barrier 50, substrate 12 typically must be removed from the coating machine that is used to apply the layer system. In the preferred embodiment, the substrate must be removed only this one time, as opposed to multiple removals required by prior art processes. Thus, the inventive process requires only one pump down cycle of the coating machine (in addition to the first start-up "pump down cycle" required before processing begins), which saves time and money, making the inventive process more efficient than prior art processes. Specifically, after barrier 50 is applied, all four subsequent layers, i.e. 34, 36, 38 and 32, can be applied without removing the substrate from the coating machine.

The fourth step in the process involves applying electrochromic layer 30 to first electrode layer 28 such that electrochromic layer 30 extends across the first electrode layer and into edge region 26a. In the preferred embodiment, application of electrochromic layer 30 includes the sub-steps of applying layer 34 to first electrode 28, thereafter applying layer 36 to layer 34, and thereafter applying layer 38 to layer 36. Electrochromic layer 30 is preferably evenly coated on first electrode 28 such that electrochromic layer 30 extends across first electrode 28 and contacts barrier 50 throughout edge region 26a while first electrode 28 physically isolates electrochromic layer 30 from substrate 12.

The fifth step in the process comprises applying second electrode 32 to electrochromic layer 30 such that the second electrode layer extends across the electrochromic layer and into the edge region. Preferably, second electrode layer 32 contacts barrier 50 along the barrier's length. In this arrangement, the electrochromic layer physically isolates the second electrode from the first electrode.

All layers are evenly coated across substrate 12 such that there is an even thickness 41 generally throughout field of view 40. Such an even, symmetrical coating of layers 28, 30 and 32 results in a structure that produces a resistance between electrodes 28 and 32 that is even throughout field of view 40. This even coating of all layers throughout field of view 40 is made possible because the interconnect-isolation barrier system is located outside field of view 40 and in edge region 26a.

The last step in the process of manufacturing the electrochromic device comprises applying second contact 48 to the second electrode layer 32 along a significant length 52, approximately one-eighth of the entire length of edge region 26a. However, the contact may be as long as approximately seven-eighths of the entire length. Typically, second contact 48 is positioned generally opposing first contact 46 across expanse 18, as shown in FIG. 6. Opposite positioning of contacts 46 and 48 may help create an even potential difference between first electrode 28 and second electrode 32, which results in even coloration of electrochromic layer 30. Opposite positioning also reduces the possibility of a short circuit. Furthermore, remote positioning reduces the bulk of system 14 in a single region of edge region 26a so that lens 12 may be easily placed in an eyeglass frame. A stacked, adjacent positioning of the contacts may be desirable to hide contacts 46 and 48 within a frame when the frame only covers a portion of the lens perimeter, such as sports lenses wherein the frame only covers the top portion of a single long lens covering both wearer's eyes. This process described above results in an EC device whereby an electrical charge may be applied across EC layer 30 resulting in the desired coloration of the device and minimal electrical charge leakage in the edge region.

Electrochromic device 10 may further include protective layers coated on second electrode 32 to protect the device from normal wear and tear such as abrasions, weather elements, ultraviolet degradation or other damage. The additional protective layers, which are not shown in the drawing, may include a buffer layer, a scratch-resistant layer, an anti-reflective layer or a hydrophobic layer.

The lacquer isolation-interconnect process just described avoids the use of mechanical or chemical masks that would be required in a mechanical or chemical isolation-interconnect system. Such masks can make manufacture of an EC device financially prohibitive because a multitude of different masks is needed for various optical lens prescriptions, lens shapes, and even for left and right lenses.

Shown by the second embodiment in FIG. 3, a second manufacturing process is described below. First, substrate 12 is coated with a first indium tin oxide (ITO) layer 28 which extends across back surface 18 of substrate 12, into edge region 26a and over bevel point 26. This first layer 28 comprises the bottom electrical contact layer. Second, after removing substrate 12 from the coating machine, first contact 46, preferably including gold ink, is applied in edge region 26a over first electrode 28 such that the gold ink extends over bevel point 26 and beyond the first electrode coating. The gold ink is thermally cured at 85° C. for approximately 7 to 10 minutes. Once cured, the gold ink provides a first contact 46 along a significant portion, preferably one-eighth of the perimeter 26a, of the device. Third, a first strip of masking tape is placed over the gold ink in edge region 26a, the masking tape extending over bevel point 26 and beyond the gold ink such that the masking tape extends onto the front surface of substrate 12. Now, the substrate is ready for application of the remaining layers.

Still referring to FIG. 3, the fourth step includes, after placing the substrate in the coating machine, successively coating a tungsten oxide ($WO_x$) layer 34 and an insulative layer 36 across surface 18, both of which extend into edge region 26a. Specifically, the $WO_x$ layer 34 and insulative layer 36 extend up to or onto the gold ink layer 46 and over the first strip of masking tape (not shown). Typically, the insulative layer is lithium aluminum fluoride (LiAlF), also referred to as "ALF". Fifth, after removing substrate 12 from the coating machine, a continuous bead of lacquer 50 is coated throughout perimeter 26a such that the lacquer extends over bevel point 26. Lacquer bead 50 prevents electrical shorts between the first and second electrodes of the device. Sixth, after placing substrate 12 into the coating machine, a vanadium oxide ($VO_x$) layer 38 and then a second ITO layer 32 are coated on surface 18 such that the layers extend into edge region 26a.

In this embodiment, as will be realized by those skilled in the art, electrical contact between $WO_x$ layer 34 and $VO_x$ layer 38 across insulative layer 36 would create an electrical short. Thus, those skilled in the art will realize that throughout the specification, edge-wise electrical contact or isolation between the first and second electrode layers will also be understood to mean edge-wise electrical contact or isolation between plural layers at least one of which is opposite the other across insulative layer 36. Those skilled in the art will also realize that the multi-layer system coated on substrate 12 may comprise organic or inorganic layers, or a mixture of organic and inorganic layers. After the sixth step, the device is ready for application of the insulative lacquer.

Still referring to FIG. 3, it may be seen that the seventh step includes, after removing the substrate from the coating machine, applying insulative lacquer 50 along edge region 26a, preferably opposite the edge region of first contact 46. The lacquer preferably is applied throughout edge region 26a but may also be applied only along a portion of the edge region. Eighth, a second gold ink layer 48 is applied in edge region 26a, generally over the second lacquer layer but in contact with second electrode 32, and generally opposite first contact 46. Ninth, a second strip of masking tape is positioned over gold ink 48. Tenth, after placing the substrate in the coating machine, an organic or inorganic coating (not shown) is coated over the second ITO layer 32. The overcoat layer may be parylene-C, UV-curable urethane, or silicone dioxide. The organic or inorganic overcoat layer acts as an environmental barrier, protecting inner layers from environmental damage to the EC device. Eleventh, after removing the substrate from the coating machine, the first and second strips of masking tape are removed to expose first and second contacts 46 and 48. Twelfth, after placing the substrate in the coating machine, a spin hard coat, also called a spin coat, is applied over the previously coated layers to protect the surface from physical abrasions and damage. Lastly, after removing the substrate from the coating machine, a third lacquer barrier is applied continuously throughout edge region 26a to protect the periphery of the device and to avoid electrical shorts between the second ITO layer 32 and a metal frame.

Another manufacturing process is described below. First, substrate 12 is coated in edge region 26a with a first release agent. The first release agent is coated generally throughout edge region 26a but leaving a first exposed region uncoated. Typically, the first release agent is coated continuously along ⅞ of the perimeter 26a, leaving ⅛ of the perimeter exposed.

The release agent typically extends from bevel point 26 onto back surface 18 the same distance as first contact 46 extends from bevel point 26 onto back surface 18 such that the contact and the layer are substantially coextensive. Typically, the first release agent is an agent which adheres to the substrate but which subsequently applied layers do not easily adhere to. In addition, the first release agent must be easily removable from the substrate by washing or by peeling the first release agent off the substrate. Typically, the first release agent is a mixture of one percent by volume and ninety-nine percent by volume water. The release agent may also be tape, a low adhesion material, such as a silicon polymer which is painted on the substrate, or ink, such as found in a typical felt tip pen.

In the second step, the first electrode layer 28 is coated across substrate 12 and extends into edge region 26a such that the first electrode layer extends onto the first release agent and into the first exposed region of perimeter 26a. Third, the first release agent is removed from substrate 12 thereby removing the portion of the first electrode layer which was coated on top of the first release agent. Where the first release agent is soap, the release agent can be removed by washing. Where the first release agent is tape, the release agent can be removed by merely peeling the tape off substrate 12. Fourth, edge region 26a is cleaned, preparing the edge region for subsequent layer deposition.

Fifth, a second release agent is applied in edge region 26a such that the second release agent extends generally throughout edge region 26a. Typically, the second release agent extends continuously throughout 7/8 of edge region 26a leaving exposed 1/8 of edge region 26a, also called a second exposed region. The second exposed region is typically located opposite the first exposed region, across substrate 12. Sixth, intermediate electrochromic layer 30 is applied such that intermediate layer 30 generally coats electrode layer 28 across substrate 12. Typically, intermediate layer 30 is applied such that the layer extends into edge region 26a and onto the second release agent, and also into the second exposed region. Seventh, second electrode layer 32 is coated onto intermediate layer 30. Typically, the second electrode layer extends into edge region 26a thereby contacting the second release agent. Eighth, the second release agent is removed from edge region 26a. Ninth, edge region 26a is cleaned to remove any residue from the second release agent.

In the tenth step, first contact 42 is applied in the first exposed region, and second contact 48 is applied in the second exposed region, such that the first and second contacts are located generally opposite from one another across substrate 12. Lastly, a protective overcoat is applied to the substrate thereby protectively coating the underlying multi-layer system, but leaving exposed the first and second contacts. Use of this multi-release agent process results in an edge isolation-contact system whereby an electrical charge may be applied across electrochromic layer 30 resulting in the desired coloration of the device and minimal electrical charge leakage in the edge region.

Yet another manufacturing process is described below. First, a first release agent is applied in edge region 26a such that the first release agent extends throughout seven-eighths of edge region 26a, thereby defining a first exposed region. Second, the first electrode layer is coated on substrate 12 such that it extends across substrate 12 and into edge region 26a, contacting the first release agent. Third, the first release agent is removed thereby removing the portion of the first electrode layer coated on top of the first release agent and leaving the portion of the first electrode layer which is in the first exposed region. Fourth, the edge region 26a is cleaned, removing residue of the first release agent.

Fifth, a second release agent is applied in edge region 26a, and typically extending around 1/8 of perimeter 26a. Preferably, the second release agent is applied in the first exposed region. The second release agent must be applied such that it overlaps the first electrode layer to create the desired isolation-contact system. Sixth, intermediate layer 30 is coated on substrate 12 thereby covering the first electrode layer and extending onto the second release agent. Seventh, the second release agent is removed, thereby removing the portion of intermediate layer 30 coated on the second release agent. Eighth, edge region 26a is cleaned to remove residue of the second release agent.

Ninth, a third release agent is applied generally throughout edge region 26a such that the third release agent extends approximately seven-eights of the distance around edge region 26a, defining a second exposed region which is located generally opposite across substrate 12 from the first exposed region. Tenth, second electrode layer 32 is applied to substrate 12 such that the second electrode layer covers the intermediate electrochromic layer and extends onto the third release agent. Eleventh, the third release agent is removed from edge region 26a. Twelfth, the edge region is cleaned to remove the residue left from the third release agent.

In step thirteen, a contact is applied in the first exposed region and a second contact is applied in the second exposed region, which are typically located opposite one another across substrate 12. Lastly, a protective overcoat is applied to the substrate thereby protectively coating the underlying multi-layer system, but leaving exposed the first and second contacts. Use of this multi-release agent process results in an edge isolation-contact system whereby an electrical charge may be applied across electrochromic layer 30 resulting in the desired coloration of the device and minimal electrical charge leakage in the edge region.

In a second embodiment, shown in FIG. 3, first electrode 28 is coated on expanse 18. First contact 46 is then coated along a significant length 52 of edge region 26a, thereby contacting bevel point 26 and first electrode 28. Thereafter, sublayer 34 and sublayer 36 of electrochromic layer 30 are coated on first electrode layer 28. Barrier 50 is then coated continuously throughout edge region 26a such that barrier 50 contacts first contact 46 along its length, and thereafter contacts substrate 12 and sublayer 36 throughout the rest of edge region 26a. Sublayer 38 of electrochromic layer 30 and second electrode 32 are then sequentially coated onto sublayer 36. Next, second contact 48 is coated on barrier 50 and second electrode 32 along a significant length 52 of edge region 26a, generally opposite first contact 46 across substrate 12.

The embodiment shown in FIG. 2 is preferred over the embodiment shown in FIG. 3 because as shown in FIG. 2, layers 34, 36, 38 and 32 are all successively coated on substrate 12 without removing the substrate from the coating machine. In contrast, the device shown in FIG. 3 must be removed from the coating machine after application of layer 28 and after application of layers 34 and 36, and subsequently replaced back into the coating machine for the final coating of layers 38 and 32. Thus, to manufacture the device of FIG. 3, two additional pump down cycles are required whereas only one pump down cycle is required to manufacture the device of FIG. 2. In another embodiment similar to the one shown in FIG. 2, contact 46 may be applied directly to substrate 12, such that the process only requires one pump down cycle in addition to the original pump down cycle.

Those skilled in the art will realize that the release agents may be removed at other various stages in the process to achieve variations of the recited processes.

Electrochromic device 10 can also be thought of as a transparent substrate 12 having an edge region 26a, and a generally flat surface 18. The device may further comprise an electrochromic layered structure 14 positioned on the flat surface, and at least partially overlapping, edge-applied, conductive material 46, 48 and insulative materials 50. These insulative materials provide layer-selective conductive and insulative edge-contact for edge-wise electrical power input to the device. Layer-selective conductive and insulative edge-contact means that predetermined layers may be contacted by a contact while other layers are not contacted and are insulated from the contact. The conductive and insulative materials are positioned out of a field of view 40 through the transparent substrate, which maximizes the field of view 40 and gives a pleasing aesthetic appearance to the device.

FIG. 4 shows a third embodiment wherein layers 28, 34, 36, 38 and 32 sequentially are coated on substrate 12 without removing substrate 12 from the coating machine. In this embodiment, only the original pump down cycle is required. Thereafter, the solid-state electrochromic device, meaning substrate 12 and the applied layers, is removed from the coating machine. After removal of the device from the coating machine, an edge-isolation channel 52 is formed in edge region 26a effectively to electrically isolate first electrode layer 28 from second electrode layer 32 in field of view 40. Edge-isolation channel 52 thereby inhibits a short circuit from occurring in the field of view of the device by electrical contact between first and second layers 28 and 32 while channel 52 permits controlled contact of a potential to such layers to power the device. As will we realized by those skilled in the art, channel 52 need only penetrate through insulative layer 36 to be effective. Nonconductive material 50 may be applied to the channel to protect the channel from damage. Typically, channel 52 extends through predetermined layers, specifically, through second electrode layer 32 and into electrochromic layer 30. Preferably, channel 52 is formed by use of a laser which allows precision depth cutting into electrochromic layer 30. However, channel 52 may be formed by any method, including use of wet chemistry, dry chemistry or mechanical abrasive removal of selected upper layers.

As shown in FIG. 4, first contact 46 and second contact 48 are each applied in edge region 26a along a substantial length of perimeter 26a. The contacts are typically positioned opposite substrate 12 from each other. First electrode layer 28 can receive a positive electrical charge, and second electrode layer 32 can receive a negative electrical charge, or vice versa, creating a potential difference through electrochromic layer 30, without first and second electrodes 28 and 32 short circuiting in edge region 26a.

Still referring to FIG. 4, typically the multi-layer coating on substrate 12 is oriented parallel to a first plane 12a, defined generally by back surface 18 of substrate 12 (which it will be understood typically is slightly curved). Channel 52 is typically oriented parallel to a second plane 52a, the second plane being oblique relative to the first plane defined by the multi-layer coating. Preferably, the second plane 52a defined by channel 52 is substantially normal to the first plane 12a defined by the multi-layer coating.

After trench, or channel, 52 is cut into the multi-layer coating, first contact 46 is applied along a substantial length of the multi-layer system in edge region 26a. Due to the relatively small thickness of the layers in edge region 26a, second electrode 32 may be electrically connected to first electrode 28 in edge region 26a. However, channel 52 prevents a short in the edge region from creating a short in field of view 40. Thus, using the short in edge region 26a as an advantage, first contact 46 may be applied to first electrode 28 or to second electrode 32 in edge region 26a to electrically connect with first electrode 28 in the edge region.

If channel 52 is not filled with a nonconductive material, contact 46, when applied, may inadvertently be applied into channel 52. If first contact 46 is applied in to channel 52, it may create a contact between the first and the second electrodes. Such contact would create an electrical short and therefore result in a non-functional EC device.

To remedy this problem, after application of first contact 46, barrier 50, which typically includes lacquer, is coated along edge region 26a such that barrier material 50 fills channel 52 along the length of contacts 46 and 48. In this channel embodiment, barrier 50 acts merely to fill channel 52 with a nonconductive material, and prevents contact materials 46 and 48 from being applied into channel 52, which would circumvent the isolative purpose of channel 52. Thus, in this embodiment, channel 52 itself electrically isolates first electrode 28 from second electrode 32 so that barrier material 50 need not extend completely around perimeter 26a but merely the length of the contacts. Preferably, barrier 50 does extend continuously around edge region 26a to protect channel 52 from the weather elements and other types of damage. In addition, barrier 50 preferably extends throughout perimeter 26a to prevent an electrical short when device 10 is placed in a metal frame.

As shown in FIG. 4A, a second trench 54 may be formed in edge region 26a, generally adjacent trench 52 to facilitate contact of first contact 46 to first electrode 28. This embodiment avoids using a short in edge region 26a to contact first electrode 28 with first contact 46. Whereas trench 52 extends continuously around perimeter 26a to isolate first electrode 28 from second electrode 32 in field of view 40, second trench 54 only need extend a limited distance along perimeter 26a, preferably, the same length as contact 46.

Typically, second trench 54 is formed through use of a laser and extends through second electrode 32 and into intermediate layer 30. Thereafter, second channel 54 may be exposed to a chemical etch or removal process so that the finished second channel 56, shown in FIG. 4B, extends down to, and exposes, first electrode 28. Contact 46 is then applied in to channel 56 such that contact 46 directly electrically contacts first electrode 28.

In the preferred embodiment, layer 28 is ITO, layer 34 is an electrochromic compound, layer 36 is an electrolyte, layer 38 is a counter-electrode, and layer 32 is another layer of ITO. Preferably, second channel 54 is cut through layer 32 and into layer 30, i.e., into 34, 36 or 38.

Thereafter, as shown in FIG. 4B, a basic pH solution, such as a sodium hydroxide chemical etch, is used to expose layer 28, shown as finished second channel 56. The sodium hydroxide solution is used because it chemically etches, or removes, layers 34, 36 and 38 but will not etch through ITO layers 28 or 32. Thus, layer 32 acts as a mask preventing enlargement of channel 54 and layer 28 is fully exposed to, but not etched by, the sodium hydroxide. Use of this combined laser/chemical etch process to first make channel 54 and then to finish it into a deeper finished channel 56, fully exposes first electrode 28 for contact with first contact 46, while not subjecting the delicate electrochromic layers 30 to more than one chemical etch. Furthermore, the laser/chemical etch formation of second channel 56 does not require use of a separate mask for second electrode 32 but instead uses second electrode 32 itself as a mask because it is not etched by sodium hydroxide. Thus, this process lowers the cost of producing the EC lens because a separate mask is not needed for each different prescription and shape of lens used. The process results in an EC device whereby an electrical charge may be applied across EC layer 30 resulting in the desired coloration of the device and minimal electrical charge leakage in the edge region.

Another method of achieving edge-wise isolation-contact comprises coating a first contact 46 in an edge region 26 of substrate 12 along a significant length. The substrate is then placed in the coating machine for application of all layers. Thus, this process requires no additional pump down cycle other than the initial pump down cycle needed to prepare the coating machine. A channel 52 is then formed in the edge region, electrically isolating the first and second electrode layers in the field of view. Due to the thickness and roughness of first contact 46, typically gold ink, first contact 46 will have areas which extend outwardly and through the thin subsequently coated layers. Thus, the first electrode can be contacted through the edge region short circuit created by first contact 46 projections which electrically connect all the layers in the edge region. An insulative layer can then be applied along a significant length to allow second contact 48 to be connected to the second electrode layer.

In another embodiment, direct electrical contact can be made between the flex circuit and the first, or second, electrode without the use of first, or second, contacts, respectively. Such an embodiment may involve mechanical pressure, in the case of eyewear, such as tightly crimping the frame about the lens, in the case of eyewear, which forces the flex circuit into contact with the appropriate electrode layer.

FIGS. 5 and 6 show front and back elevational views, respectively, of the preferred embodiment.

In another embodiment, the device may comprise the use of insulative material and a channel which work in combination to permit electrical isolation and interconnection between layers coated on a substrate. Specifically, the device may comprise a substrate having an edge region and a generally flat surface. The device may further comprise an electrochromic layered structure located on the generally flat surface and an edge-applied insulative material at least partially overlapping with the layered structure. The device may also comprise a channel formed in an edge region of the electrochromic layered structure, the insulative material and the channel together providing layer-selective insulative edge-contact in the edge region for edge-wise electrical power input to the device. The device may also further comprise edge-applied conductive material.

Thus, the device may include edge-applied insulative material, edge-applied conductive material, a channel, or a combination thereof, to achieve the dual purpose of edge-wise electrical isolation and interconnection of the layers. The insulative material, the conductive material, the channel, or any combination thereof is herein referred to as an isolation mechanism. Thus, the particular isolation mechanism chosen results in electrical isolation and yet permits interconnection of appropriate layers of the monolithically layered system.

As shown in FIG. 7, the invention further comprises a process and a device 57 for applying coating material, such as first or second contacts 46 and 48 or preferably barrier 50, to the perimeter of an eccentric substrate, the process comprising the following steps. First, a substrate 12 is provided having a generally flat expanse 18 bounded by an eccentric perimeter 26a. For example, eccentric substrate 12 may be a noncircular substrate or an eccentrically mounted circular substrate. The substrate has a substrate axis 58 through a central region of the expanse. Substrate axis 58 is typically normal or perpendicular to the generally planar surface of expanse 18.

Next, substrate 12 is mounted, through use of an adhesive 61 or the like, to a rotary motor 60 which rotates the substrate about substrate axis 58 such as in direction 60a. Typically, substrate 12 is mounted to rotary motor 60 on the terminal end of its rotating spindle or shaft.

Rotary motor 60 is connected to a linear motion mechanism 62, the linear motion mechanism moving the motor 60 and the mounted substrate 12 in a line 64 generally perpendicular to substrate axis 58. Typically, linear motion mechanism 62 comprises a simple pulley system which is counterweighted such that minimal power is required to move substrate 12 and rotary motor 60 along line 64.

Next, a coating material 50 is applied to a roller mechanism 66. Roller mechanism 66 typically includes one roller 66a but may include dual rollers 66a and 66b, operatively associated with one another. Roller 66a and roller 66b rotate in directions 68 and 70, respectively, thereby spreading coating material 50 over an upper surface 66c of roller 66a. Roller 66a is typically positioned generally adjacent the perimeter 26a of substrate 12 when the substrate is mounted on rotary motor 60.

Still referring to FIG. 7, to coat lens perimeter 26a of substrate 12 with coating material 50 on roller 66a, substrate 12 is rotated in direction 60a by rotary motor 60. At the same time, the substrate is moved linearly along line 64 by linear motion mechanism 62 such that perimeter 26a continuously contacts coating material 50 at a region 66d on roller 66a. As substrate 12 is rotated about substrate axis 58, perimeter 26a and roller 66a have the same velocity at contact region 66d such that coating material 50 is evenly coated on perimeter 26a of substrate 12. As will be understood by those skilled in the art, effecting relative motion between the substrate and the coating material to be applied will produce the desired result. Thus, in another embodiment, the substrate may be held stationary as the adjacent mechanisms are moved.

Figure 7A:
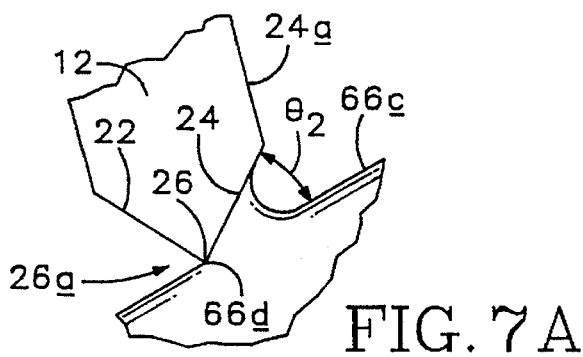
FIG. 7A is a fragmentary enlargement of the area labeled A of FIG. 7.

Typically, substrate 12 is an eyeglass lens having an outer bevel 22, an inner bevel 24 and a bevel point 26, shown in FIG. 7A (which is a fragmentary detail of area A of FIG. 7). To achieve an even coating of material 50 on edge region 26a two angles, namely $\theta_1$ and $\theta_2$ are of importance.

Referring again to FIG. 7, $\theta_1$ represents the angle between upper surface 66c of roller 66a and a baseline, typically the horizontal, represented by line 72. Material 50, which is applied to roller 66a, tends to flow downwardly along surface 66c due to gravity. As $\theta_1$ is increased, material 50 tends to flow more quickly. As the flow speed increases, more material tends to wick up onto the perimeter 26a due to surface tension, coating a larger portion of the perimeter. Controlling $\theta_1$ controls the amount of this wicking of material 50 onto substrate 12.

As shown in FIG. 7A, $\theta_2$ represents the angle between inner bevel 24 and surface 66c. Varying $\theta_2$ determines the bevel surface of lens 12 to which material 50 is applied. Specifically, as $\theta_2$ is increased, the wicking action of material 50 along inner bevel 24 is decreased due to surface tension, and the wicking action of material 50 on bevel point 26 and outer bevel 22 is increases. As $\theta_2$ approaches 0°, the wicking action of material 50 tends to coat only inner bevel 24. As θ₂ becomes negative, meaning that only edge 24a near inner bevel 24 contacts material 50 and that bevel point 26 is lifted up off edge 66c, the wicking action of material 50 tends to coat only inner bevel 24 and does not coat bevel point 26 or outer bevel 22.

Controlling the rate of application of material 50 to roller 66a, angle θ₁, angle θ₂, the rotary speed of substrate 12 created by rotary motor 60, and the linear motion of substrate 12 created by linear motion mechanism 62, all vary the location and thickness of coating 50 applied to edge region 26a. Other factors which may influence the application of material 50 to substrate 12 include the viscosity of material 50, the composition of the material, the distance between rollers 66a and 66b which influences the thickness of material 50 on surface 66c, and the temperature of the coating procedure.

Figure 8:
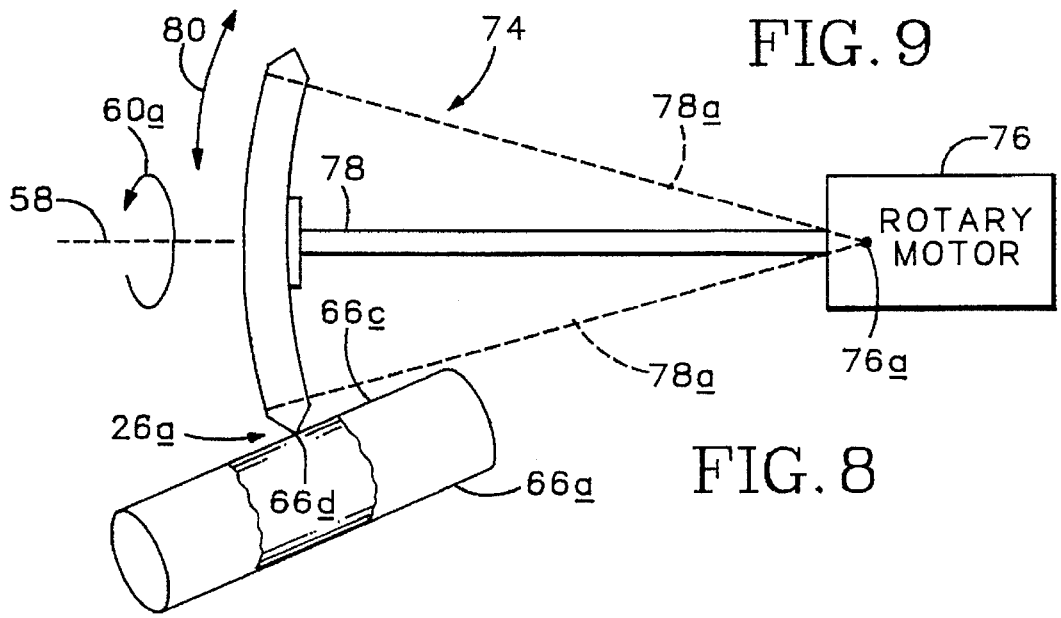
FIG. 8 illustrates a second embodiment of the apparatus shown in FIG. 7.

As shown in FIG. 8, another embodiment of a device 74 for applying coating material 50 to edge region 26a includes a rotary motor 76 having an arm 78, the length of which is the same as the radius 78a of substrate 12 measured from a pivot point, or focal point 76a to the outer surface 16 of substrate, or what may be referred to now as a lens, 12. Arm 78 rotates substrate 12 about substrate axis 58 in direction 60a while moving substrate in direction 80. Direction 80 is a curving motion which defines a circular arc of radius 78a of the outer curvature, also called a base, of eyeglass substrate 12. Stated another way, swing arm 78 is the same length 78a as the outer radius 78a of substrate 12 measured from focal point 76a to the outer surface 16 of the substrate. In this manner, as swing arm 78 rotates substrate 12 in direction 60a about axis 58, and simultaneously moves substrate 12 in direction 80, contact point 66d remains in contact with surface 66c of roller 66a. In this manner, an even coating of material 50 is applied to perimeter 26a, regardless of the shape of substrate 12. This application process is particularly useful for applying barrier material 50 to an eyeglass lens having an eccentric perimeter or a circular lens which is eccentrically mounted on device 74. While not shown in FIG. 8, such pivotal arrangement may also be counter-weighted.

In another way of describing the invention, the invention comprises a device for applying coating material to the perimeter of an eccentric optical lens, the lens having a lens axis generally orthogonal to its generally planar expanse. The device comprises a rotary motor adapted for mounting a lens on the motor, the motor structured to rotate the lens about the lens axis. The device also comprises a linear motion mechanism connected to the rotary motor, the linear motion mechanism moving the rotary motor in a direction generally perpendicular to the lens axis when the lens is mounted on the rotary motor. The device further comprises an applicator positioned generally adjacent a perimeter of the lens when the substrate is mounted on the rotary motor. The linear motion mechanism and the applicator mechanism are operatively associated such that the linear motion mechanism moves the lens as the rotary motor rotates the lens such that the lens contacts the applicator mechanism at a fixed point. In other words, the linear motion mechanism and the rotary motor move the lens relative the applicator so that the perimeter of the lens, or substrate, contacts the applicator mechanism at the same point on the applicator mechanism as the lens is rotated.

Figure 9:
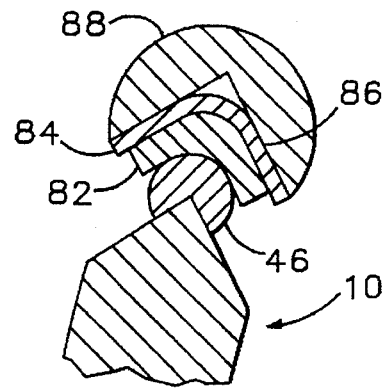
FIG. 9 illustrates a partial cross section of another embodiment of the invention.

As shown in FIG. 9, the invention further comprises conductive pads 82 to effect an electrical contact between electrochromic device 10 and a conductor 84, such as a flex circuit (which is connected to a power drive circuit, not shown), the conductor and the circuit controlling and powering device 10. Specifically, device 10 is shown with first contact 46 (the multi-layer system not being shown for clarity) located generally within the recess 86 of an eyewear lens frame 88. Those skilled in the art will realize that frame 88 may be a camera lens frame, a mirror frame, a window frame, or the like and may be one of a variety of cross-sectional shapes. In addition, those skilled in the art will realize that direct contact may be made between the flex circuit, the elastomeric pad, and the appropriate electrode layer without use of a contact 46 or 48.

Preferably conductor, or lens-contacting region, 84 is formed of gold-plated copper, thereby to ensure reliable electrical contact and to reduce the tendency of the copper to corrode, especially under more severe environmental conditions. Elastomeric conductive strip or pad 82 is located between conductor 84 and first contact 46, pad 82 resiliently expanding or being compressed to fill the gap between flex circuit conductor region 84 and first contact 46. Those skilled in the art will realize that such elastomeric conductive strips 82 may also be used to connect a second contact 48 (not shown) to a second conductor region of the flex circuit. Typically, pad 82 is an anisotropic connector sheet, such as "Shin-Flex MAF-Connector", available from Shin-etsu Polymer America, Inc. Preferably, pad 82 is manufactured by providing corrosion-resistant conductive filler material such as nickel particles, gold particles, or carbon or gold-coated nickel particles within an elastomeric material. The conductive filler materials can be in the form of needles, random particles, or flakes, so long as they provide thickness-wise conductivity through pad 82.

Still referring to FIG. 9, when the elastomeric pad 82 is compressed by pressure between substrate 12 and frame 88, the conductive particles contact one another thereby creating an electrical path through the elastomer pad 82. In another embodiment, the conductive filler materials may be generally needle-shaped defining an electrical path from one side of the pad to the other, e.g. extending from contact 46 to conductor 84. The elastomeric material used to manufacture pad 82 may be silicon, rubber or the like. Preferably, tacky silicon is used such that pad 82 has adhesive properties which make it easy to adhere pad 82 to conductor 84 or to contact 46.

In another embodiment, pad 82 may comprise metal powders mixed in a slurry with silicon caulk, or a solder paste, which is then cured. In yet another embodiment, pad 82 may be manufactured directly on conductor 84 by a silk screen process. Silk screening pad 82 directly onto the conductor 84 saves labor by reducing the manufacturing step of adhering pad 82 to conductor 84. In another embodiment, pad 82 can be manufactured directly on contacts 46 or 48. In yet another embodiment, conductor 84 may be a wire and pad 82 may be manufactured directly around wire 84, e.g., as part of an extrusion or rolling process.

Pad 82 has the additional benefits of preventing shock to device 10 such as physical shock, thermal shock, vibrational shock and contamination by dirt or moisture. In addition, the resilient properties of pad 82 allow for greater tolerances in manufacturing a system incorporating electrochromic device 10. Specifically, in the case where electrochromic device 10 is a pair of prescription optical glasses, each substrate 12 is a hand-ground lens having a specific shape to fit a specific eyeglass lens, and a width determined by the eyeglass prescription. Due to these numerous variables, producing an eyeglass lens having a multi-layer electrochromic system coated thereon, may not fit perfectly within the chosen eyeglass frame. Such an imperfect fit may result in a poor electrical contact between a contact, such as contact 46, and its respective conductor such as conductor 84. Use of elastomeric pad 82 increases the tolerance of the system by providing a resilient and flexible electrical connection path.

In another embodiment, the multi-layer isolation-interconnection EC system can be used as a super-capacitor. In other words, the isolation-interconnect system, which provides for electrical current flow in directions 42 and 44 through a central region of the layered device, may be used as an electrical component in an electrical system. In such an embodiment, the aesthetics of the device will typically be immaterial, as will the optical properties. For example, one may replace the transparent conductive indium tin oxide with a metal, such as aluminum or gold.

The invention also comprises a process of efficiently mass producing electrochromic devices, such as windows or mirrors. The process involves the following steps. First, a substrate is provided which includes an expanse. The expanse may be a long sheet of glass or a continuous sheet of glass fed directly from a glass sheet manufacturing process. Coatings are then applied generally across the expanse. Specifically, a first electrode layer, then an intermediate electrode layer, then a second electrode layer are coated on the expanse. The substrate is then physically divided into sections having a central region. Preferably the sections are standard-shaped windows or mirrors. In addition, odd- or custom-shaped sizes may be cut from the substrate. The cut and separated section will have a central region and an edge region, or perimeter, extending completely around the section. A channel is then formed in the edge region of the separated section to electrically isolate the layers in the central region. An electrical contact is connected to the first electrode and another electrical contact is connected to the second electrode in the edge region to complete manufacture of the electrochromic device.

The benefits of this process allow large substrates to be coated and thereafter physically cut to specified dimensions. This process decreases pump down cycles of the coating machine. In addition, the substrate can be stored and physically cut at a later time which decreases the cost and time required to manufacture custom-sized sections, e.g. window panes, for use as electrochromic devices.

While the present invention has been shown and described with reference to the foregoing preferred embodiment, it will be apparent to those skilled in the art that other changes in form and detail may be made therein without departing from the spirit and scope of the invention as defined in the appended claims.

We claim:

1. An electrochromic device comprising:
   a substrate having an expanse and a peripheral edge region;
   a first electrode layer applied to the substrate and extending substantially across the expanse and wrapping around the peripheral edge region;
   an electrochromic layer applied to the first electrode, the first electrode layer physically isolating the electrochromic layer from the substrate;
   a second electrode layer applied to the electrochromic layer and extending substantially across the expanse and wrapping around the peripheral edge region, the electrochromic layer physically isolating the second electrode layer from the first electrode layer;
   a first contact electrically connected to the first electrode layer along the peripheral edge region;
   an isolative barrier applied to the first electrode layer and extending along a perimeter of the peripheral edge region;
   a second contact electrically connected to the second electrode layer along the peripheral edge region; and
   the isolative barrier electrically isolating the first contact from the second electrode layer and electrically isolating the second contact from the first electrode layer.

2. The device of claim 1 wherein the first contact includes metal.

3. The device of claim 1 wherein the second contact includes metal.

4. The device of claim 1 wherein the isolative barrier is formed of a material which includes lacquer.

5. The device of claim 1 wherein the isolative barrier is formed of a material which includes an organic resin.

6. The device of claim 1 wherein the first contact is applied to the first electrode layer along the peripheral edge region.

7. The device of claim 6 wherein the first contact extends along a significant length of the peripheral edge region.

8. The device of claim 1 wherein the second contact is applied to the second electrode layer along the peripheral edge region.

9. The device of claim 8 wherein the second contact extends along a significant length of the peripheral edge region.

10. The device of claim 1 wherein the electrochromic layer comprises at least two sublayers.

11. The device of claim 1 wherein the isolative barrier extends continuously throughout the edge region.

12. The device of claim 1 wherein the first electrode layer, the electrochromic layer and the second electrode layer all extend substantially coextensively with one another across the substrate.

13. A process for manufacturing an electrochromic device, the process comprising the steps of:
   providing a substrate having an expanse and a peripheral edge region, the edge region having a determined perimeter length;
   applying a first electrode layer on the expanse such that the first electrode layer extends substantially across the expanse and wraps around the peripheral edge region;
   applying a first contact to the first electrode layer along a significant length of the peripheral edge region;
   applying an isolative barrier to the first electrode layer and to the first contact in the peripheral edge region such that the barrier extends throughout the perimeter of the peripheral edge region;
   applying an electrochromic layer to the first electrode layer such that the electrochromic layer extends substantially across the first electrode layer;
   applying a second electrode layer to the electrochromic layer such that the second electrode layer extends substantially across the electrochromic layer and wraps around the peripheral edge region in an area already covered by the isolative barrier; and
   applying a second contact to the second electrode layer along a significant length of the peripheral edge region.

14. An edge-isolation-contact system for use in a solid-state electrochromic device, the device having a multi-layer coating on one side thereof, a field of view, and an edge region, the coating being capable of allowing current to flow through it by having a first electrode layer for receiving a positive electrical charge, a second electrode layer for receiving a negative electrical charge, and an intermediate electrochromic layer positioned between the first and second electrode layers, the edge-isolation-contact system comprising:

an edge-isolation channel formed in a predetermined one of the first and second electrode layers in such edge region to electrically isolate the first electrode layer from the second electrode layer in the field of view, thereby inhibiting a short circuit from occurring by electrical contact between the first and second electrode layers and permitting controlled contact of a potential to such layers to power the device.

15. The system of claim 14 further comprising a dielectric material in the channel.

16. The system of claim 15 wherein the dielectric material includes lacquer.

17. An electrochromic isolation-interconnect system to prevent an electrical short and to permit flow of current between opposite electrodes via an intermediate electrochromic layer, the system comprising:

a substrate having an edge region and a generally flat surface having a central region;

a first electrode layer substantially coating the surface of the substrate;

a second electrode layer;

an intermediate electrochromic layer located between and permitting electrically connection between the first and second electrode layers; and an isolation mechanism including a first channel formed in the second electrode layer to electrically isolate the first electrode layer from the second electrode layer in the central region.

18. The system of claim 17 wherein a nonconductive material is located in the first channel.

19. The system of claim 17 wherein a second channel is formed in the second electrode layer to permit direct contact between the first contact and the first electrode layer.

20. The system of claim 17 wherein the first channel is formed by use of a laser.

21. The system of claim 17 wherein the first channel is formed by use of a chemical etch.

22. The system of claim 17 wherein the first channel is formed by use of mechanical abrasion.

23. The system of claim 17 further comprising a first conductive material electrically connected to the first electrode layer and wherein the first conductive material includes metal.

24. The system of claim 23 further comprising a second conductive material electrically connected to the second electrode layer and wherein the second conductive material includes metal.

25. The system of claim 18 wherein the nonconductive material includes lacquer.

26. The system of claim 19 wherein the second channel is formed by use of a chemical etch.

27. The system of claim 19 wherein the second channel is formed by use of a laser.

28. The system of claim 19 wherein the second channel is formed by use of a laser and a chemical etch.

29. An electrochromic edge contact-isolation system for permitting electrical current to flow between a first electrode layer and a second electrode layer only through an intermediate electrochromic layer, for maximizing the field of view through the system, and for facilitating electrical connection to the system, the system comprising:

an optical substrate including a field of view;

a coating on the substrate, the coating including a first electrode layer generally covering a surface of the substrate, an intermediate electrochromic layer generally covering the first electrode layer, and a second electrode layer generally covering the electrochromic layer; and an isolative channel formed in an edge region of the second electrode layer, the channel electrically isolating the first electrode layer from the second electrode layer throughout the field of view.

30. The system of claim 29 further comprising a first conductive material electrically connected to the first electrode layer.

31. The system of claim 30 further comprising a second conductive material electrically connected to the second electrode layer.

32. An electrochromic device comprising:

a substrate having an edge region and a generally flat surface;

electrochromic layered structure located on the generally flat surface, the electrochromic layered structure including a first electrode layer, a second electrode layer, and an electrochromic layer between the first and second electrode layers;

an edge-isolation channel extending at least partially around edge region of the substrate; and edge-applied conductive material at least partially overlapping with the layered structure and providing layer-selective conductive edge-contact in the edge region for edge-wise electrical power input to the device.

33. The device of claim 32 further comprising edge-applied insulative material within the edge isolation channel.

34. The device of claim 33 wherein the conductive and insulative materials are positioned out of a field of view through the substrate.

35. The device of claim 32 wherein the edge-isolation channel is formed through use of a laser.

36. The device of claim 32 wherein the edge-isolation channel is formed by wet chemical etching.

37. The device of claim 32 wherein the edge-isolation channel is formed by dry chemical etching.

38. The device of claim 32 wherein the edge-isolation channel is formed through use of mechanical abrasion.

39. The device of claim 32 wherein the substrate is plastic.

40. The device of claim 32 wherein the substrate is glass.

41. The device of claim 32 wherein the substrate is a camera lens.

42. The device of claim 32 wherein the substrate is an eyeglass lens.

43. The device of claim 32 wherein the substrate is a window.

44. The device of claim 32 wherein the substrate is a mirror.

45. The device of claim 32 wherein the substrate is a capacitor.

46. The device of claim 32 wherein the conductive material includes metal.

47. The device of claim 33 wherein the insulative material includes lacquer.

48. An electrochromic system comprising:

a frame including a recess;

an electrochromic device mounted in the frame, the device including a substrate having an edge region, the device further including an electrode which extends into the edge region;

a conductor located in the recess, the conductor adapted for powering the device; and a conductive elastomer extending within the recess, the elastomer electrically connecting the conductor and the electrode.

49. The system of claim 48 wherein the conductor is a flex circuit.

50. The system of claim 48 wherein the conductor comprises individual wires.

51. The system of claim 48 wherein the conductor comprises a flex circuit and wires.

52. The system of claim 48 wherein the conductive elastomer is manufactured of metallic particles contained within an elastomeric material.

53. The system of claim 48 wherein the system further comprises an electrical contact located in the edge region, the contact located between and electrically connecting the electrode and the conductive elastomer.

54. A process for manufacturing an electrochromic device, the process comprising the steps of:

providing a transparent substrate having an expanse and a peripheral edge region, the edge region having a determined length;

applying a first release agent to a portion of the edge region;

applying a first electrode layer on the expanse such that the first electrode layer extends substantially across the expanse and into the edge region thereby contacting the first release agent;

removing the first release agent;

applying a second release agent in the edge region;

applying an electrochromic layer to the first electrode layer such that the electrochromic layer extends across the first electrode layer and into the edge region thereby contacting the second release agent;

applying a second electrode layer to the electrochromic layer such that the second electrode layer extends across the electrochromic layer and into the edge region; and removing the second release agent.

55. The process of claim 54 further including the step of applying a first contact to the first electrode layer in the edge region.

56. The process of claim 54 further including the step of applying a second contact to the second electrode layer in the edge region.

57. A process for manufacturing an electrochromic device, the process comprising the steps of:

providing a substrate having an expanse;

coating a first electrode layer, a second electrode layer and an intermediate electrochromic layer generally across the expanse;

physically dividing the substrate into at least two sections, one of the sections having an edge region and a central region;

forming an isolative channel in the edge region of said one of the sections to electrically isolate the layers in the central region;

providing electrical contact to the first electrode; and providing electrical contact to the second electrode to power the electrochromic device.

58. An electrochromic device comprising:

a substrate having an expanse and a beveled peripheral edge region including a pair of bevel regions which converge toward a bevel point;

a first electrode layer applied to the substrate and extending substantially across the expanse and over at least one of the bevel regions to wrap around the peripheral edge region;

an electrochromic layer applied to the first electrode, the first electrode layer physically isolating the electrochromic layer from the substrate;

an isolative barrier applied to the first electrode layer and extending along a perimeter of the peripheral edge region;

a second electrode layer applied to the electrochromic layer and extending substantially across the expanse and over at least one of the bevel regions to wrap around the peripheral edge region, the electrochromic layer physically isolating the second electrode layer from the first electrode layer throughout the expanse and the isolative barrier physically isolating the second electrode layer from the first electrode layer throughout the peripheral edge region;

a first contact electrically connected to the first electrode layer along the peripheral edge region;

a second contact electrically connected to the second electrode layer along the peripheral edge region; and the isolative barrier electrically isolating the first contact from the second electrode layer and electrically isolating the second contact from the first electrode layer.

* * * * *